US009703624B2

(12) United States Patent
Purushothaman et al.

(10) Patent No.: US 9,703,624 B2
(45) Date of Patent: Jul. 11, 2017

(54) EVENT CORRELATION AND CALCULATION ENGINE

(71) Applicant: Bank of America Corporation, Charlotte, NC (US)

(72) Inventors: Sasidhar Purushothaman, Hyderabad (IN); Ketan J. Ghelani, Mumbai (IN); Moinuddin Shaikh, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 92 days.

(21) Appl. No.: 14/880,349

(22) Filed: Oct. 12, 2015

(65) Prior Publication Data
US 2017/0102988 A1  Apr. 13, 2017

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 11/0772* (2013.01)

(58) Field of Classification Search
CPC ............ G06F 11/0709; G06F 11/0751; G06F 11/0772; G06F 11/079; G06F 11/0793
See application file for complete search history.

(56) References Cited

U.S. PATENT DOCUMENTS

| | | | |
|---|---|---|---|
| 5,568,491 A | 10/1996 | Beal et al. | |
| 6,237,114 B1* | 5/2001 | Wookey | G06F 11/0748 714/47.2 |
| 8,205,122 B1 | 6/2012 | Leverich et al. | |
| 9,053,216 B1* | 6/2015 | Coleman | G06F 11/302 |
| 2004/0153844 A1 | 8/2004 | Ghose et al. | |
| 2008/0148110 A1 | 6/2008 | Bhamidipaty et al. | |
| 2009/0182794 A1 | 7/2009 | Sekiguchi | |
| 2010/0164715 A1* | 7/2010 | Buller | G08B 13/1427 340/539.32 |
| 2010/0174812 A1 | 7/2010 | Thomas et al. | |
| 2012/0110153 A1 | 5/2012 | Atkins et al. | |
| 2012/0144020 A1 | 6/2012 | Carey et al. | |
| 2012/0204068 A1 | 8/2012 | Ye et al. | |
| 2012/0304012 A1 | 11/2012 | Atkins et al. | |
| 2013/0097620 A1 | 4/2013 | Carey et al. | |
| 2013/0132149 A1* | 5/2013 | Wei | G05B 23/0281 705/7.28 |
| 2014/0019814 A1 | 1/2014 | McNairy et al. | |

(Continued)

OTHER PUBLICATIONS

Office Action in U.S. Appl. No. 14/880,374, Mar. 29, 2017.
Office Action in U.S. Appl. No. 14/880,421, Apr. 18, 2017.

*Primary Examiner* — Joshua P Lottich
(74) *Attorney, Agent, or Firm* — Weiss & Arons LLP; Michael A. Springs, Esq.

(57) ABSTRACT

Apparatus and methods for learning and implementing rules for remediating system errors are provided. The method may include identifying a configuration item that is not in compliance with a configuration baseline. The method may also include tracking a workflow executed by a remote user in an attempt to remediate the configuration error. The method may additionally include monitoring the status of the configuration item. In the event the workflow brings the configuration item in compliance with the configuration baseline, the method may further include storing the workflow in a database.

9 Claims, 5 Drawing Sheets

(56) References Cited

U.S. PATENT DOCUMENTS

| | | |
|---|---|---|
| 2014/0040673 A1 | 2/2014 | Carey et al. |
| 2014/0047273 A1 | 2/2014 | Carey et al. |
| 2014/0068343 A1* | 3/2014 | Nakajima ............ G06F 11/3051 714/39 |
| 2015/0033243 A1 | 1/2015 | Carey et al. |
| 2015/0121136 A1 | 4/2015 | Namkoong et al. |
| 2015/0193296 A1* | 7/2015 | Chen ..................... G06F 11/079 714/15 |
| 2015/0195165 A1 | 7/2015 | Boger |
| 2015/0355976 A1 | 12/2015 | Carey et al. |
| 2016/0004582 A1* | 1/2016 | Nagura ............... H04L 41/0663 714/15 |

* cited by examiner

EVENT CORRELATION AND CALCULATION ENGINE

FIELD OF TECHNOLOGY

Aspects of the disclosure relate to providing apparatus and methods for remediating system failures. In particular, the disclosure relates to apparatus and methods for remediating system failures by creating and implementing rule-based remediation routines.

BACKGROUND

Information Technology ("IT") personnel are challenged with ensuring the health and operational quality of multiple electronic environments. Degradation of services or downtime of the electronic environments can have a considerable negative impact on both revenue and quality of experience for end users and customers.

Typically, in the event of a system failure, a IT personnel accesses the failing system and attempts to resolve the problem. After one, two or more attempts at resolution, the IT personnel typically succeeds at restoring the health of the system. However, the problem-solving techniques used by the IT personnel are typically neither recorded nor saved for future use. This is not desirable at least because saving and implementing such a technique in the future can potentially minimize system downtime and remediate failures quickly and efficiently.

It would be desirable, therefore, to provide apparatus and methods for tracking and saving a user's activity when resolving a system error. It would also be desirable to provide apparatus and methods for implementing the saved activity in the event of similar or identical errors at a later point in time.

SUMMARY OF THE DISCLOSURE

Systems and methods are provided for remediating a system error. The method may include monitoring data on a first server and identifying a first error on the first server. The method may also include transmitting an alert including first error data and recording, in a database, a plurality of instructions received by the first server from a remote user. The plurality of instructions may be responsive to, and later in time than, the transmission of the alert.

The method may also include identifying a resolution of the first error subsequent to the execution of the plurality of instructions. The method may further include storing data in a database in response to resolution of the first error, the data including the first error data and the plurality of instructions.

The method may also include monitoring data on a second server; identifying a second error on the second server; and extracting second error information from the second server. The method may further include searching the database for error data substantially similar to the second error information and, based on the second error data, identifying the first error in the database. The method may also include extracting the plurality of instructions and running the plurality of instructions on the second server.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for remediating system failures are provided. The apparatus and methods may be implemented on any suitable hardware device, such as a mobile phone, tablet, personal computer, television, server, or any other hardware or software that supports a connection to one or more communication networks.

The apparatus and methods of the invention may include a Monitoring and Reporting Platform ("MRP"). The MRP may be in electronic communication with a plurality of databases and servers. The MRP may be configurable.

The MRP may execute proactive auditing and monitoring on one or more monitoring environments. The MRP may execute proactive auditing and monitoring on a weekly, daily, hourly, or continuous basis. In some embodiments, the MRP may audit and monitor a plurality of configuration items. Exemplary configuration items may include hardware, hardware components, software, software components, firmware, firmware components, servers, applications, documents, systems, the configuration and/or logic of any of the aforementioned items, and any other electronic or physical device.

The MRP may audit and monitor the configuration items during the life cycle of the configuration item. An exemplary life cycle may include one or more of preliminary design, detailed design, building and testing, deployment and maintenance.

The MRP may output event metric values for one, two, or more of the plurality of the configuration items. An event metric value may include configuration item data, such as a version number, performance metrics, response time, or any other suitable data. An event metric value may include one or more incidents that have already occurred on a configuration item. The selection of the incidents may be configurable.

An event metric value may include performance and/or capacity data. Exemplary performance and capacity data include CPU-related data, log monitoring, file system data, process data, memory data, cluster data, event log data, general machine down alert data, logical disk space, security monitor service alert data, memory data, reboot from bug check, scheduling event log data, service down, service hung, time synchronous difference, time synchronous event log, unexpected shut down, virtual memory event log, virus scan time, group owner change, customer group down and/or cluster disk fatal.

Each event metric value may be associated with a configuration item identifier. The configuration item identifier may identify the configuration item for which the metric value was created.

The apparatus and methods of the invention may also include an Event Correlation and Calculating Engine (ECCE). The ECCE may be in electronic communication with a plurality of databases and servers. The ECCE may be in electronic communication with the MRP. The MRP may transmit data to the ECCE. Transmitted data may include metric values and associated data. The ECCE may receive the transmitted data from the MRP.

In some embodiments, the ECCE may also be in electronic communication with an Alerting Definition Dictionary (ADD). The ADD may define threshold configuration settings for a plurality of configuration items. A threshold configuration setting may be a configuration baseline. Exemplary configuration baselines include version numbers, performance metrics, response time, and for any other suitable data such as the event metric value data described above.

The ECCE may use the ADD to identify configuration item error data. For the purposes of this application, 'configuration item error data' or 'error data' may refer to any characteristic or performance by a configuration item that is not in conformance with a configuration baseline or a threshold configuration setting.

The ECCE may identify error data by retrieving an event metric value and a configuration item identifier associated with the event metric value, accessing, in the ADD, a configuration item baseline associated with the configuration item identifier, and comparing the event metric value to the configuration item baseline.

Exemplary configuration item baselines include a threshold number occurrence of a set of events, and/or the occurrence of a set of events in a particular pattern. The events may be any event associated with the event metric values described above. An exemplary configuration item baseline may include a CPU crossing a threshold of associated disk read failure more than a predetermined number of times. An additional exemplary configuration item baseline may include a CPU utilizing a volume of memory that is greater than a baseline value more than a predetermined number of times.

Some configuration item baselines may be created or modified based on an occurrence and/or behavioral pattern of an event metric value in relation to other parameters such as the performance of one or more different configuration items. For example, if an event metric value is received, reporting that a hardware or software configuration item has breached a first configuration item baseline more than a predetermined number of times, a second configuration item baseline may be modified. The second configuration item baseline may be modified by lowering or increasing a counter value identifying a number of times that the performance of a second configuration item must be suboptimal in order to be determined to be below the second configuration item baseline.

Additional exemplary configuration item baselines may be created by the ECCE. For example, in some embodiments, the ECCE may identify a set of events that potentially, or actually, resulted in a failure. The ECCE may then record, in the ADD, the set of events that potentially, or actually, resulted in the failure. The ECCE may also record sets of events that are similar to those that potentially, or actually, resulted in the failure.

In the event that the ECCE identifies error data for one or more configuration items, the ECCE may generate an electronic transmission of one or more notifications to one or more predetermined electronic destinations. The notification may be an alert, a pop-up box, an e-mail, a text, or any other suitable electronic communication. The notification may include one or more of error data, a configuration item associated with the error data, a configuration baseline associated with the configuration item, an error identifier, and any other suitable data.

The error identifier may include any suitable combination of letters and numbers. The error identifier may be assigned to the error data by the ECCE, the ADD or the MRP. The error identifier may be stored in a database accessible to the ECCE. The error identifier may be stored together with data including a configuration item identifier and/or configuration item error data.

The error data included in the notification generated by the ECCE may include error data associated with a configuration item. The notification may include one or more of hardware and resource configuration data, details of the configuration item and a number of failures reported on the configuration item during a past period of time. The past period of time may be a day, a week, a month, a year, or any other suitable time period. The past period of time may be configurable.

In some embodiments, a notification generated by the ECCE may include error data associated with a plurality of configuration items. The notification may include error data as detailed above.

The ECCE may store error data in a database. Each of the stored errors may be associated with one or more electronic destinations. In the event that the ECCE identifies error data, the ECCE may retrieve from the database one or more electronic destinations associated with the error data. The ECCE may subsequently transmit the error data to the retrieved electronic destinations. For example, a first set of IT professionals may receive a first set of error data and a second set of IT professionals may receive a second set of error data.

The ECCE may include a dashboard displayed on a graphical user interface ("GUI"). The ECCE may grant a user authorized access to the database. A user with authorized access may be presented with selectable options that, when selected, personalize the dashboard displayed to the user. For example, the user may customize data displayed on the dashboard. The dashboard may display notifications generated by the ECCE in the form of an alert, a pop-up box, text, an e-mail, or any other suitable electronic identifier.

The dashboard may include a graphical user interface for displaying live data relating to one or more configuration items. For example, the dashboard may display a snapshot of the monitoring health of one or more configuration items.

The dashboard may include remote diagnostic functionalities. The dashboard may provide a user with a plurality of applications and tools for performing remote diagnostics on one or more configuration items.

A user may remotely access and attempt to fix a configuration item in response to receipt, from the ECCE, of a notification of error data associated with the configuration item. For example, the user may select and execute one or more tools or features included on the dashboard in an attempt to fix the configuration item, or bring the configuration item in conformance with a configuration baseline.

The ECCE may continually track and record the workflow of the user. In some embodiments, the workflow may include the event bundles and the action sequence of the user. For example, the ECCE may continually rank and record the tools and features selected by the user in addition to the sequential order in which they were executed.

The ECCE may assign a rule number to the user workflow being tracked. The ECCE may associate the rule number with a configuration item identifier identifying a configuration item the workflow is trying to fix. The ECCE may also associate the rule number with configuration item error data detailing the error the user is attempting to fix. The ECCE may store the rule number, details of the workflow being tracked, the configuration item identifier and the configuration item error data in a monitoring and storing database.

The ECCE may identify configuration data for associating and storing together with a rule number by receiving an error identifier input into an ECCE desktop. The error identifier may be input into the ECCE desktop prior to the user commencing the workflow. In some embodiments, the ECCE desktop may require a user to input an error identifier prior to attempting to remediate a configuration item error. As detailed above, the error identifier may be included in a notification alert generated by the ECCE and stored in a database together with configuration item data.

In yet other embodiments, the ECCE may identify, based on user-input instructions and actions, a configuration error that the user is attempting to solve. The ECCE may then associate configuration item error data and/or a configuration item identifier with the rule number.

For example, in some embodiments, the ECCE may display an error on the dashboard. The ECCE may also display, in close proximity to the error, a selectable icon. The selectable icon may be entitled 'Create Rule,' 'Remediate' or may be given any other suitable title. A user may select the selectable icon and subsequently attempt to remediate the error. The ECCE may subsequently record the user's sequence of actions, functionalities invoked and/or selections executed in the dashboard. The ECCE may associate the recorded information with the rule displayed adjacent to the selected icon.

The ECCE may monitor the health of a configuration item that the user is trying to fix. The ECCE may identify the configuration item being fixed using the methods detailed above, or using any other suitable method.

In the event the ECCE identifies the complete or partial resolution of the configuration item error, the ECCE may record the entire user's workflow in a rules database. In some embodiments, the ECCE may record at least a portion of the user's workflow in the rules database. The portion of the workflow stored by the ECCE in the rules database may be the portion of the workflow that successfully remediated the configuration item error. The ECCE may validate the success of a workflow by using the error message to identify the error being remediated, and subsequently checking the health of the configuration item being remediated. For example, the ECCE may check the service status, process status and/or the remote agent status of the configuration item after execution of the workflow.

A user of the system may force the ECCE to adopt a workflow executed by the user by selecting the 'Create Rule' button after the execution of the workflow is complete.

The data recorded by the ECCE after the complete or partial resolution of a configuration item may also include a rule number associated with the workflow, error data detailing the error that the workflow successfully resolved, and a configuration item identifier identifying the configuration item that was successfully remediated.

In some embodiments, a rule created by the ECCE may be deployed by a deployment engine substantially immediately after creation of the rule or upon the lapse of a predetermined time period. In some of these embodiments, details of a rule deployed by the deployment engine may be transmitted to one or more predetermined electronic addresses.

In some embodiments, once a rule is created by the ECCE, the rule may be transmitted to one or more predetermined e-mail addresses. The rule may be later deployed by the deployment engine after receiving instructions from an authorized user to deploy the rule.

In some embodiments, rules that pertain to critical business services or system integrity may require authorization prior to deployment. Exemplary rules that may require authorization prior to deployment include rules that, when deployed, alter the functioning of a hardware, software or firmware component. Rules that do not pertain to critical business services or system integrity may be deployed by the deployment engine substantially immediately after creation or upon the lapse of a predetermined time period.

In some embodiments, a user of the ECCE may manually create and deploy a rule in the rules database.

After creating and storing a rule in the rules database, the ECCE may receive data from the MRP that, when analyzed using the ADD, identifies an error. Prior to generating a notification notifying a user about the error, the ECCE may first search the rules database. The ECCE may search the rules database for a rule that, when deployed, may resolve the error. In some embodiments, the ECCE may identify a suitable rule for deployment by comparing error data associated with the error to error data associated with the stored rule(s).

If the ECCE identifies error data associated with a rule that is similar to, substantially similar to, or identical to error data associated with a rule, the ECCE may, in some embodiments, execute the rule in an attempt to solve the problem. If the rule is successful at resolving the problem, the ECCE may or may not transmit a notification detailing the error and the successful remediation.

In some embodiments, the ECCE may identify a rule in the rules database by searching the rules database using one or more wildcard entries. In some of these embodiments, the ECCE may not identify a rule by exact match of the error, but instead by identifying a stored rule with one or more wildcard entries similar to, or identical to, wildcard entries included in error data of the error that the ECCE is attempting to remediate.

For example, a service failure remediation error rule may be a common error across multiple systems. Additionally, the restarting of the service in an attempt to fix the service failure may be common across multiple systems, and may use similar or identical set(s) of instructions. Thus, identification of a rule for system failure may be executed by identifying in the rules database wild card entries including terms such as "Service", "failed", "Process" and/or "not responding".

In the event that the rule executed by the ECCE is unsuccessful at remediating the error, the ECCE may transmit a notification to one or more predetermined e-mail addresses reporting the error, error data, and, in some embodiments, the rule(s) that were unsuccessfully executed in an attempt to resolve the error.

In some embodiments, if error data associated with an error is similar to, substantially similar to, or identical to error data associated with a rule stored in the rules database, the ECCE may transmit a notification to one or more predetermined e-mail addresses reporting the error, error data, and one or more rules identified in the rules database. A user may then have the option of executing the rule by selecting a selectable option on his dashboard.

The ECCE may identify an error. The error may be complex. The ECCE may combine two or more rules stored in the rules database in an attempt to resolve the error. For example, in some embodiments, the rules database may store two rules associated with the same error. This may occur when the ECCE identifies two different remediation sequences that were successful at remediating the error. In the event the ECCE receives error data identifying this error, the ECCE may execute both rules in an attempt to remediate the error.

Two or more rules associated with one error may be stored in the rules database in a stack. The ECCE may execute the combined rules sequentially based on the outcomes. In some embodiments, the option of sequences and/or arranging the rules within a stack may be manually customizable by a user of the system. A user may enable or disable one or more sets of rules as part of the sequential execution of the stack.

For example, a particular service may fail. The ECCE may learn, through tracking user behavior, that restarting the service can fix the system failure. The ECCE may then store a rule in the rules database associating the service failure error with restarting the service. At a later point in time, the ECCE may learn, through tracking user behavior, that restarting the service with a particular set of command line parameters can fix the system failure. The ECCE may now also store this rule in the rules database. The ECCE may store this rule by adding it to the stack of rules already created for the service failure error.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
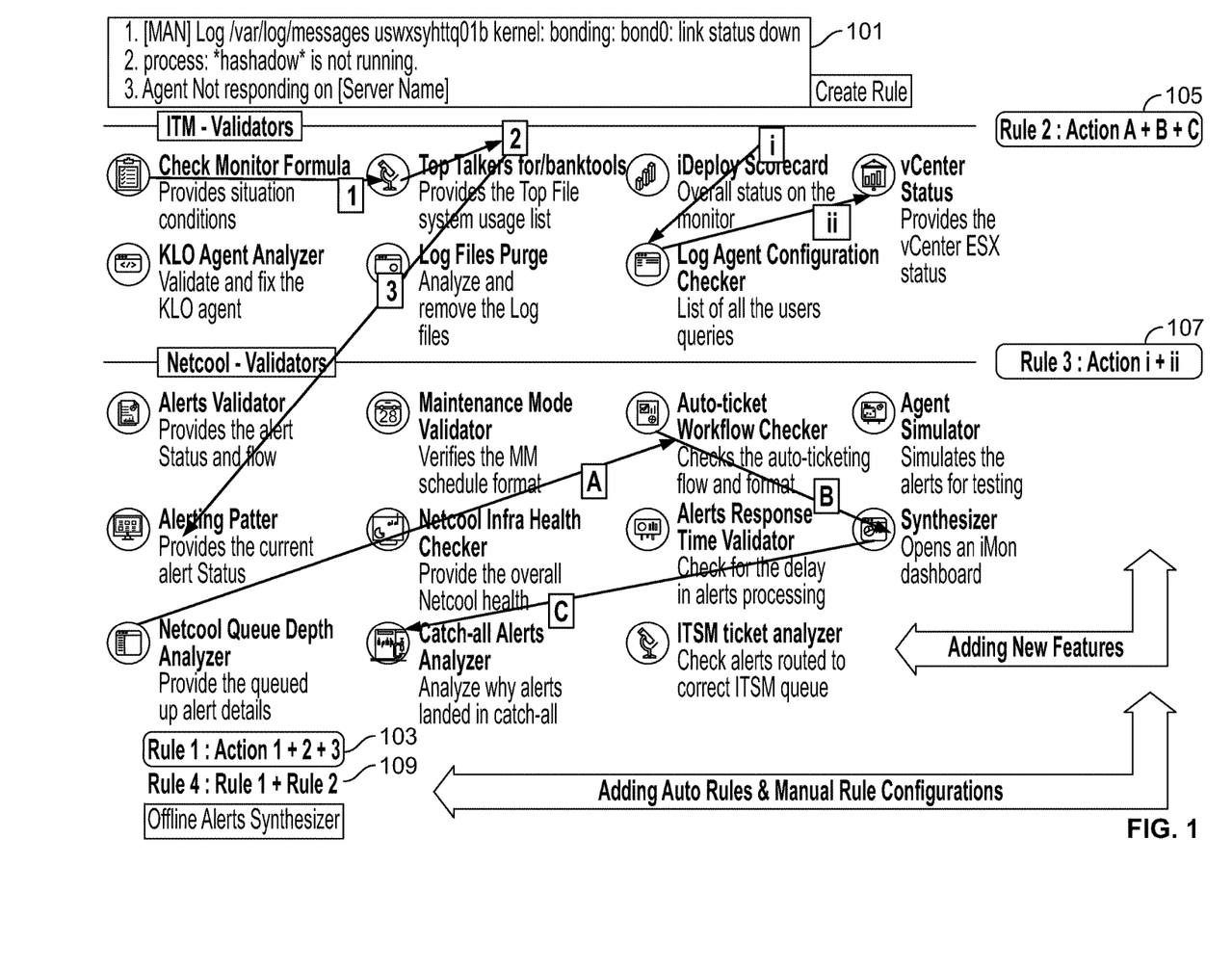
FIG. 1 shows a graphical user interface and a process in accordance with the invention.

FIG. 1 illustrates an exemplary graphical user interface ("GUI") and a process that may be executed in accordance with the systems and methods of the invention.

The graphical user interface illustrated in FIG. 1 may include error notification 101. Error notification 101 may be generated by the ECCE. Error notification 101 may include data detailing an error that occurred on a server.

FIG. 1 illustrates a process initiated by a user in an attempt to remediate the error reported in error notification 101. The process may include the user executing actions 1, 2 and 3. Action 1 may include checking the monitor where the error occurred. Action 2 may include searching a data file reporting the system usage of a plurality of computers and comparing the data file to error notification 101. Action 3 may include generating a current alert status based on data obtained from actions 1 and 2 or any other suitable combination of actions and/or rules.

The user may subsequently execute actions A, B and C. Action A may include generating a queue of data including alert details. Action B may include opening a display of the data queue. Action C may include analyzing why the error notification 101 was transmitted to a catch-all error database.

The user may lastly execute actions i and ii. Action i may include checking queries that generated error notification 101. Action ii may include selecting an option to provide vCenter ESX status. This status may be a check performed to ascertain the availability of a core infrastructure component that is needed to enable the system to perform the rest of the steps in the sequence.

The ECCE may track the selections executed by the user in the GUI. At step 103, the ECCE may store actions 1, 2 and 3 as Rule 1. At step 105, the ECCE may store actions A, B and C as Rule 2. At step 107, the ECCE may store actions i and ii as Rule 3.

At step 109, the user of the GUI may create new Rule 4. The user may create Rule 4 by selecting the text box 'Create Rule' displayed next to error notification 101. The user may define Rule 4 as being a combination of rules 1 and 2.

Figure 2:
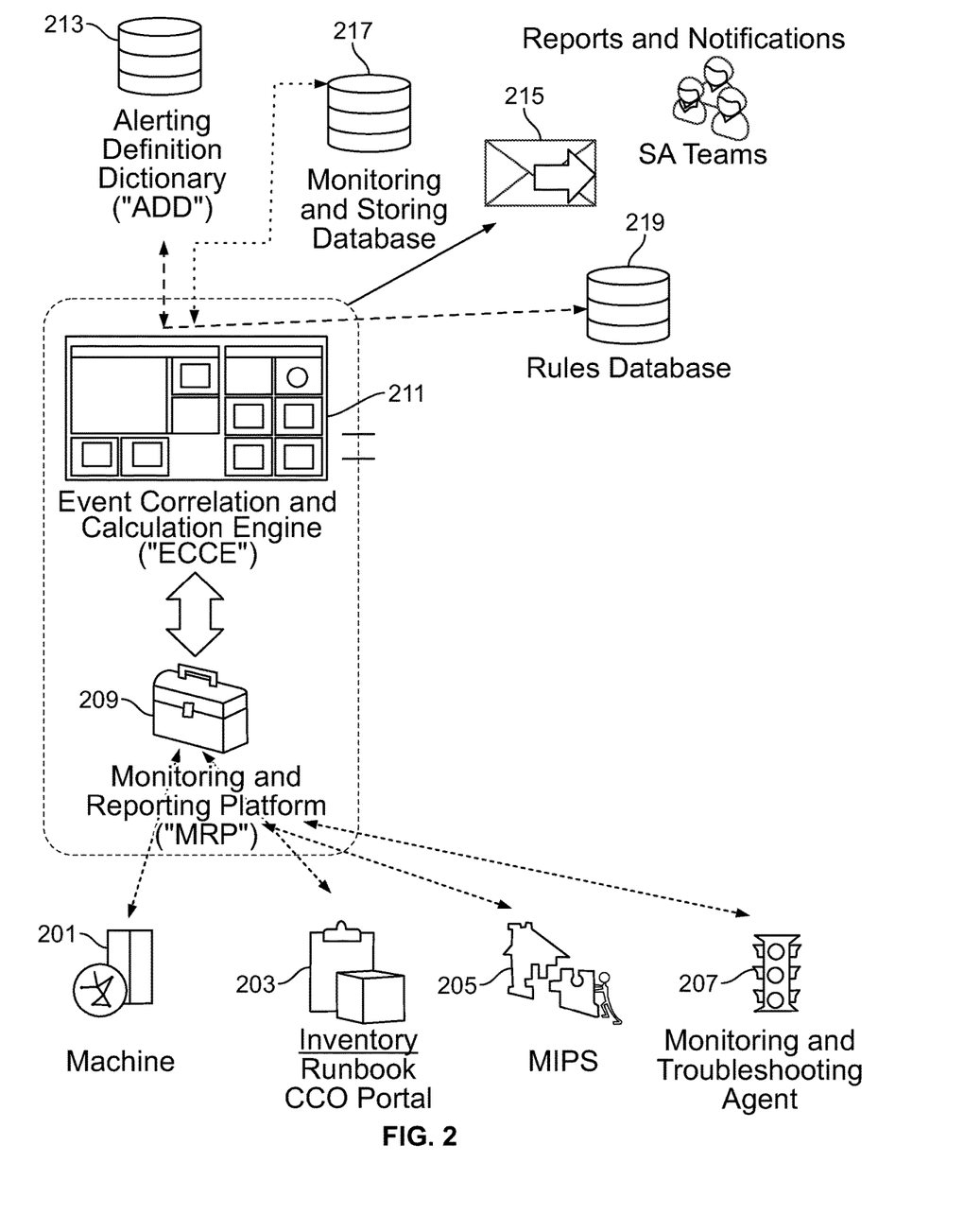
FIG. 2 shows a process and apparatus in accordance with the invention.

FIG. 2 illustrates an exemplary process and exemplary apparatus that may be used in accordance with the systems and methods of the invention.

The process illustrated in FIG. 2 may include Machine 201, Inventory Runbook CCO Portal 203, Million Instructions Per Second ("MIPS") 205, and Monitoring and Troubleshooting Agent 207. Apparatus 201-207 may feed information to Monitoring and Reporting Platform ("MRP") 209.

Machine 201 may feed hardware performance data to MRP 209. Exemplary hardware performance data includes hard drive status, fan status, memory module status, CPU temperature, fan speed, chassis temperature and power supply status.

Inventory Runbook CCO Portal 203 may transmit configuration item data to MRP 209. In some embodiments, the Runbook may include structured inventory records of a plurality of configuration items. Details of the configuration items may include location, configuration, systems analysis manager, support team and any other suitable details. Inventory Runbook CCO Portal 203 may also act as a centralized mechanism to tweak the monitoring needs of a configuration item and/or as an interface for reviewing event occurrence of a given configuration item.

MIPS 205 may transmit measurements of computer performance to MRP 209. Monitoring and Troubleshooting Agent 207 may transmit configuration item data to MRP 209.

MRP 209 may transmit and/or pull data from one or more of Machine 201, Inventory Runbook CCO Portal 203, MIPS 205 and Monitoring and Troubleshooting Agent 207. MRP 209 may use the data received and/or pulled to generate and transmit event metric values to ECCE 211.

ECCE 211 may process the event metric values received from MRP 209. ECCE 211 may identify configuration item errors based on the event metric values by accessing Alerting Definition Dictionary ("ADD") 213. ECCE may identify the errors by comparing the event metric values received from MRP 209 to baselines stored in ADD 213.

In the event that ECCE 211 identifies one or more configuration item errors, ECCE 211 may transmit one or more electronic notifications 215. Electronic notifications 215 may report one or more errors identified by the ECCE. Electronic notifications 215 may be transmitted to one or more predetermined e-mail addresses. The e-mail addresses may be accessed by IT personnel, System Analysis ("SA") teams, business personnel, or any other suitable user.

In some embodiments, a user may access an ECCE dashboard and attempt to fix a configuration item error reported in electronic notification 215. In some embodiments, the user may input an identification number that identifies the error prior to attempting to fix the problem.

The ECCE may monitor and store the user's workflow and action sequence while the user attempts to fix the error. The ECCE may store the user's workflow and action sequence in Monitoring and Storing Database 217. If the ECCE identifies error resolution in response to the user's workflow, the ECCE may begin the process of storing the user's workflow and action sequence in Rules Database 219. A detailed description of an exemplary process executed by the ECCE when storing a rule in Rules Database 219 is illustrated in FIG. 3.

In some embodiments, ECCE 211 may attempt to remediate an error identified in the ADD prior to, concurrently with, or after transmitting electronic notification 215. ECCE 211 may attempt to remediate the error by accessing Rules Database 219 and identifying a rule with associated error data defining an error similar to the error that ECCE 211 is attempting to fix.

Rules stored in Rules Database 219 may be based on workflows and action sequences monitored by ECCE 211 using any of the methods described above.

Figure 3:
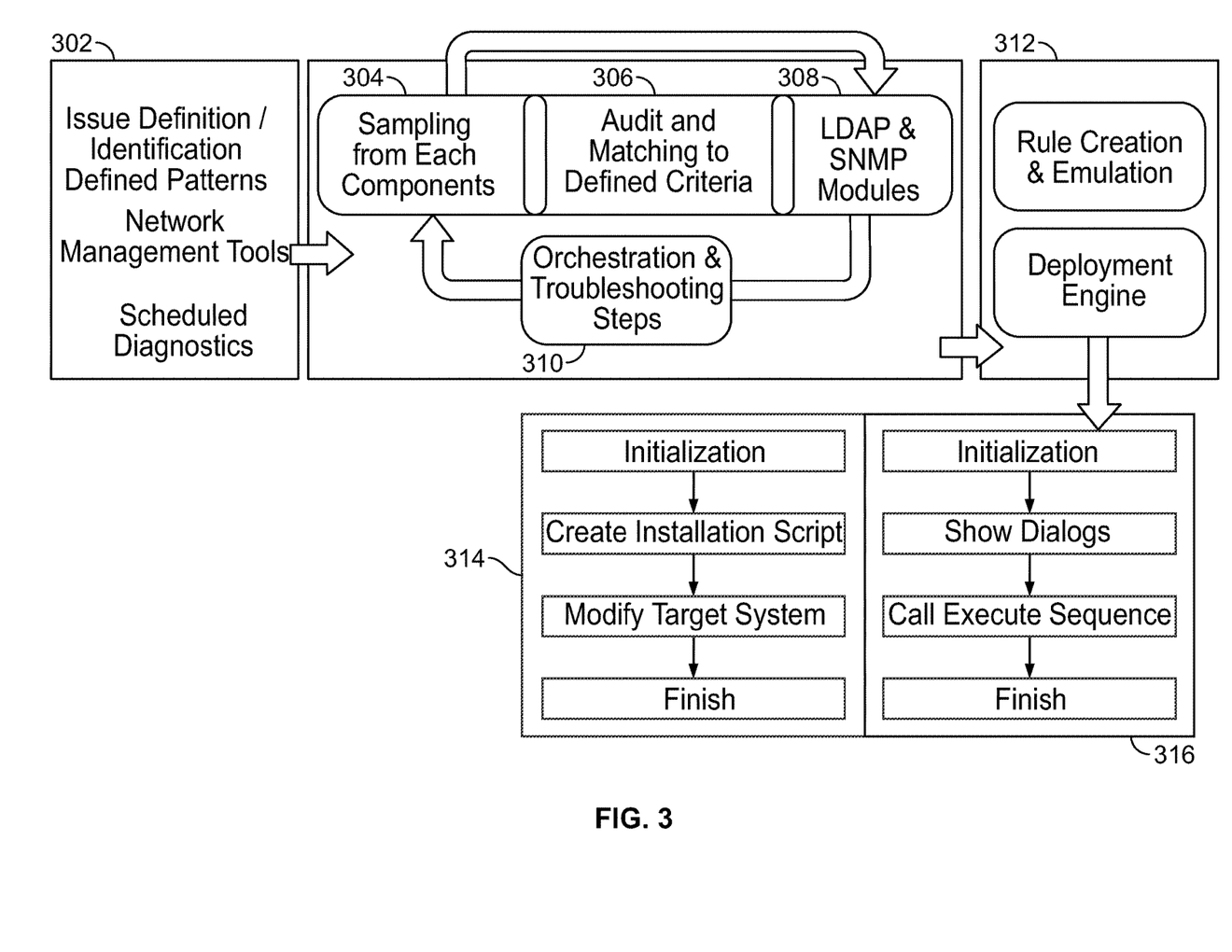
FIG. 3 shows a process in accordance with the invention.

FIG. 3 shows an exemplary process that may be used in accordance with the systems and methods of the invention. The exemplary process illustrated in FIG. 3 may be executed by the ECCE when creating and deploying rules in Rules Database 219.

The exemplary process may include step 302. Step 302 may include identifying configuration item errors. Configuration item errors may be identified by using one or more of defining issues and identifying issues with the defined issue patterns, using network management tools and/or executing scheduled diagnostics.

At step 304, the ECCE may sample data from each of the configuration items and feed the sampled data into core modules. At step 306, the core modules may attempt to match the sampled data to alerting definition criteria. At step 308, the matching of sampled data to alerting definition criteria may invoke LDAP queries and SNMP queries. At step 310 the invoked queries may execute predetermined sets of troubleshooting instructions.

At step 312 a rule may be created and emulated by a deployment engine. The rule may be created after successful completion and identification of a workable rule. Subsequent to the creation of the model, the deployment engine may determine if the rule affects core business technology or system integrity.

If the rule does not affect core business technology or system integrity, the deployment engine may execute step 314. At step 314, the deployment engine may deploy the rule in a rules database. Deployment of the rule in the rules database may include initialization, creation of an installation script, modification of a target system and completion of the deployment.

If the rule does affect core business technology or system integrity, the deployment engine may execute step 316. At step 316, the deployment engine may initialize a dialogue and display the dialog to an authorized user on a graphical user interface included in the dashboard generated by ECCE 211. The dialogue may describe the rule and how the rule would be deployed in the rules database. In the event the deployment engine receives instructions from a user to deploy the rule in the rules database, the deployment engine may call an execute sequence and complete the deployment of the rule in the rules database.

Figure 4:
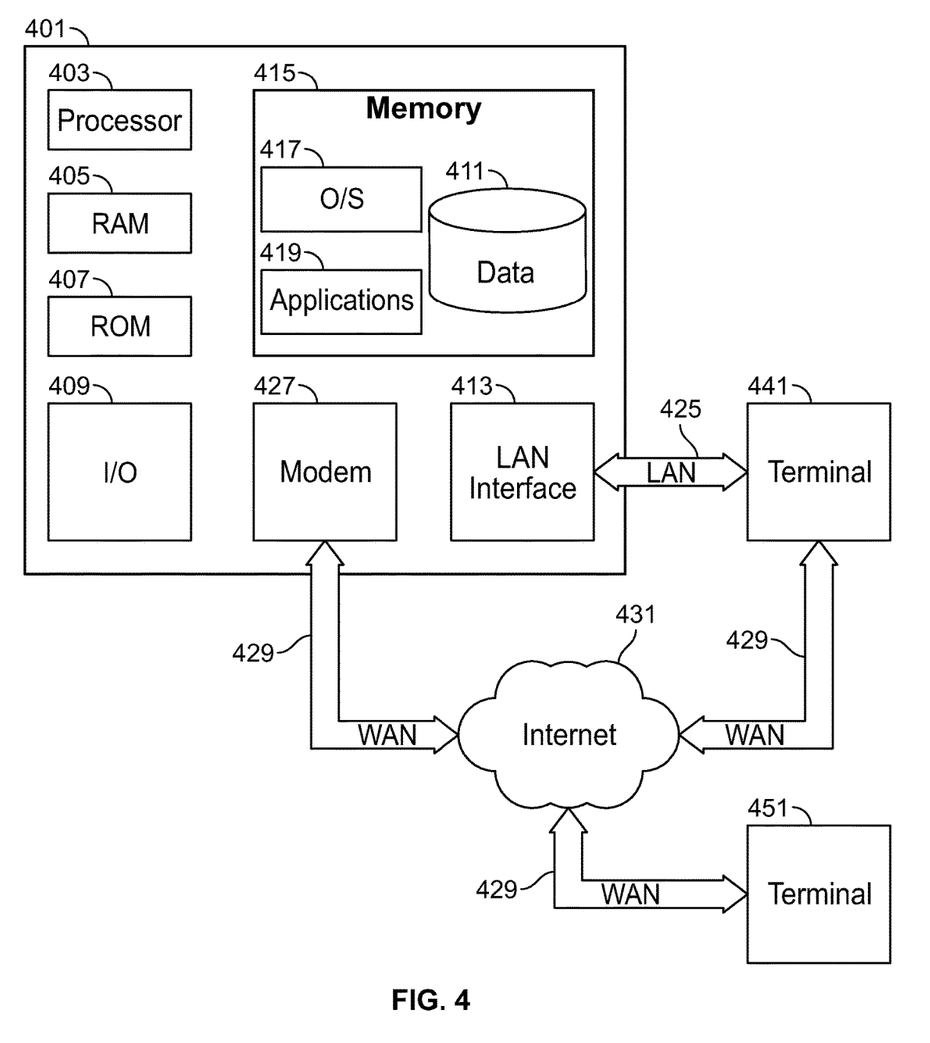
FIG. 4 shows apparatus in accordance with the invention.

FIG. 4 is a block diagram that illustrates computing device 401 (alternately referred to herein as a "server") that may be used to execute one or more processes and methods in accordance with illustrative embodiments of the invention. The computer server 401 may have a processor 403 for controlling overall operation of the server and its associated components, including RAM 405, ROM 407, input/output module 409, and memory 415.

Input/output ("I/O") module 409 may include a microphone, keypad, touch screen, and/or stylus through which a user of server 401 may provide input, and may also include one or more of a speaker for providing audio output and a video display device for providing textual, audiovisual and/or graphical output. Software may be stored within memory 415 and/or storage to provide instructions to processor 404 for enabling server 401 to perform various functions. For example, memory 415 may store software used by server 401, such as an operating system 417, application programs 419, and an associated database 411. Alternately, some or all of server 401 computer executable instructions may be embodied in hardware or firmware (not shown). Database 411 may provide storage for information input into the MRP, ECCE, ADD, Rules Database, and/or the Monitoring and Storing Database.

Server 401 may operate in a networked environment supporting connections to one or more remote computers, such as terminals 441 and 451. Terminals 441 and 451 may be personal computers or servers that include many or all of the elements described above relative to server 401. The network connections depicted in FIG. 4 include a local area network (LAN) 425 and a wide area network (WAN) 429, but may also include other networks. When used in a LAN networking environment, computer 401 is connected to LAN 425 through a network interface or adapter 413. When used in a WAN networking environment, server 401 may include a modem 427 or other means for establishing communications over WAN 429, such as Internet 431. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages or screens via the World Wide Web from a web-based server. Any of various conventional web browsers can be used to display and manipulate data on web pages.

Additionally, application program 419, which may be used by server 401, may include computer executable instructions for invoking user functionality related to communication, such as email, short message service (SMS), and voice input and speech recognition applications.

Computing device 401 and/or terminals 441 or 451 may also be mobile terminals including various other components, such as a battery, speaker, and antennas (not shown).

A terminal such as 441 or 451 may be used by a user of the ECCE dashboard to access and input information into ECCE dashboard, including remotely accessing one or more configuration items. Information input into the ECCE dashboard may be stored in memory 415. The input information may be processed by an application such as one of applications 419.

Figure 5:
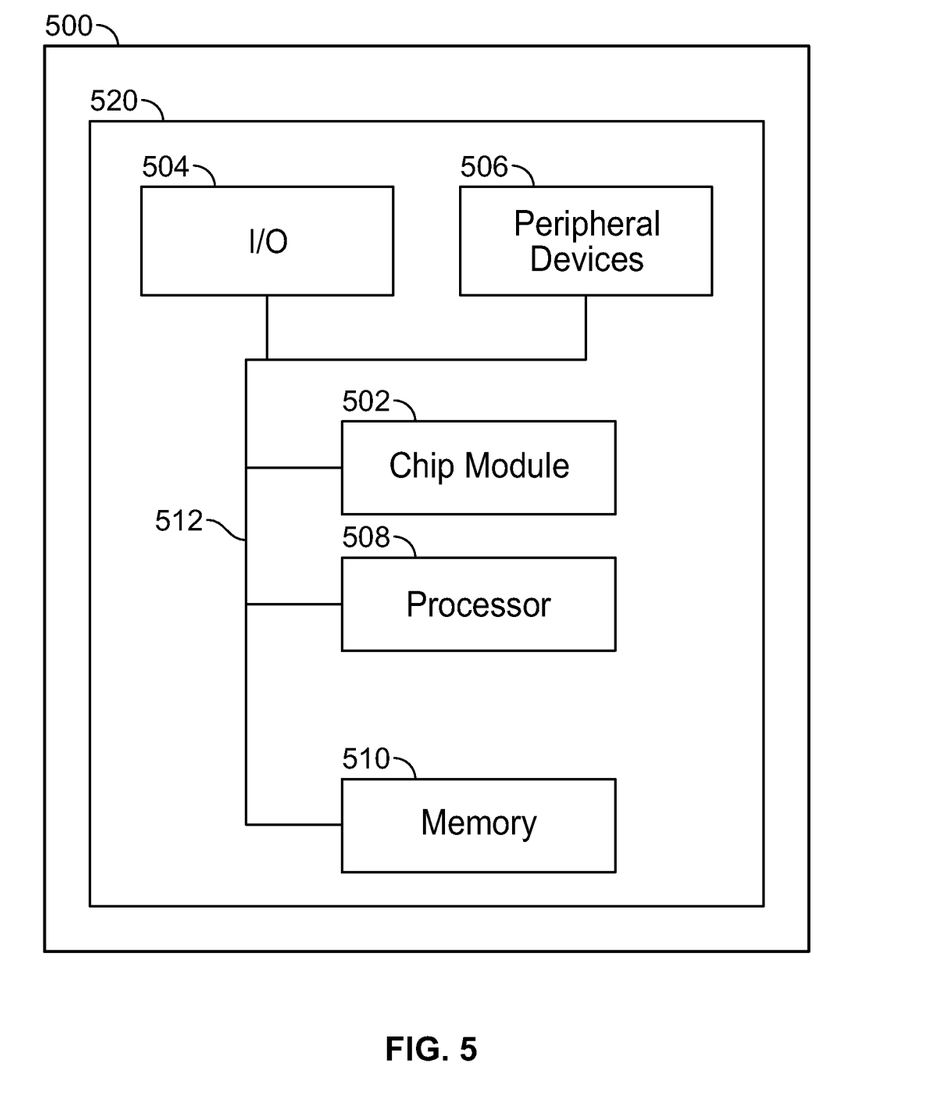
FIG. 5 shows additional apparatus in accordance with the invention.

FIG. 5 shows an illustrative apparatus that may be configured in accordance with the principles of the invention.

FIG. 5 shows illustrative apparatus 500. Apparatus 500 may be a computing machine. Apparatus 500 may be included in apparatus shown in FIG. 4. Apparatus 500 may include chip module 502, which may include one or more integrated circuits, and which may include logic configured to perform any other suitable logical operations.

Apparatus 500 may include one or more of the following components: I/O circuitry 504, which may include the transmitter device and the receiver device and may interface with fiber optic cable, coaxial cable, telephone lines, wireless devices, PHY layer hardware, a keypad/display control device or any other suitable encoded media or devices; peripheral devices 506, which may include counter timers, real-time timers, power-on reset generators or any other suitable peripheral devices; logical processing device ("processor") 508, which may compute data structural information, structural parameters of the data, quantify indicies; and machine-readable memory 510.

Machine-readable memory 510 may be configured to store in machine-readable data structures: data lineage information; data lineage, technical data elements; data elements; business elements; identifiers; associations; relationships; and any other suitable information or data structures.

Components 502, 504, 506, 508 and 510 may be coupled together by a system bus or other interconnections 512 and may be present on one or more circuit boards such as 520. In some embodiments, the components may be integrated into a single silicon-based chip.

It will be appreciated that software components including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively and/or additionally, be implemented wholly or partly in hardware, if desired, using conventional techniques.

Various signals representing information described herein may be transferred between a source and a destination in the form of electromagnetic waves traveling through signal-conducting encoded media such as metal wires, optical fibers, and/or wireless transmission encoded media (e.g., air and/or space).

Apparatus 500 may operate in a networked environment supporting connections to one or more remote computers via a local area network (LAN), a wide area network (WAN), or other suitable networks. When used in a LAN networking environment, apparatus 500 may be connected to the LAN through a network interface or adapter in I/O circuitry 504. When used in a WAN networking environment, apparatus 500 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 508, for example over the Internet.

Apparatus 500 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Thus, systems and methods for an enhanced electronic monitoring solution have been provided. Persons skilled in the art will appreciate that the present invention can be practiced by other than the described embodiments, which are presented for purposes of illustration rather than of limitation.

What is claimed is:

1. One or more non-transitory computer-readable media storing computer-executable instructions which, when executed by a processor on a computer system, perform a method for remediating a system error, the method comprising:

receiving a first set of data including a first event metric value and a first configuration item identification number identifying a first configuration item on a first server;

in response to a determination that the first event metric value is below a first configuration threshold, transmitting an alert to a predetermined electronic address;

recording, in a first database, a plurality of instructions received by the first server from a remote user, the plurality of instructions being responsive to, and received at later in time than, the transmission of the alert;

identifying compliance of the first configuration item with the first configuration threshold subsequent to the execution of the plurality of instructions;

in response to the identification of the compliance, storing the plurality of instructions in a second database;

receiving a second set of data including a second event metric value and a second configuration item identification number identifying a second configuration item on a second server;

in response to a determination that the second event metric value is below the second configuration threshold, searching the second database for a configuration item identification number identical to the second configuration item identification number;

identifying the first configuration item identification number;

extracting the plurality of instructions; and executing the plurality of instructions on the second server.

2. The media of claim 1 wherein, in the method, the first configuration item identification number is identical to the second configuration item identification number.

3. The media of claim 1 wherein the method further comprises monitoring data on a plurality of servers.

4. The media of claim 1 wherein the method further comprises transmitting a notification to a predetermined e-mail address prior to the executing of the instructions.

5. The media of claim 4 wherein, in the method, the executing of the plurality of instructions is initiated subsequent to the receipt of a user command.

6. The media of claim 1 wherein, in the method:
the first set of data includes a first error identifier; and
the plurality of instructions are input by the remote user into a graphical user interface ("GUI").

7. The media of claim 6 wherein the method further comprises:
receiving the first error identifier, the first error identifier being input into the GUI;
in response to receipt of the first error identifier, recording the plurality of instructions input into the GUI; and
associating the instructions with the first error identifier.

8. The media of claim 1 wherein, in the method, the determination that the first event metric value is below a first configuration threshold includes:
accessing an error definitions database; and
comparing the first event metric value to the first configuration threshold, the first configuration threshold being stored in the error definitions database.

9. The media of claim 8 wherein, in the method, the determination that the second event metric value is below a first configuration threshold includes:
accessing the error definitions database; and
comparing the second event metric value to the second configuration threshold, the second configuration threshold being stored in the error definitions database.

* * * * *